United States Patent
Hoover et al.

(10) Patent No.: US 9,244,438 B2
(45) Date of Patent: Jan. 26, 2016

(54) ANGULAR AND AXIAL POSITION SENSOR ARRANGEMENT

(71) Applicant: The Swatch Group Research and Development Ltd, Marin (CH)

(72) Inventors: David Hoover, La Sarraz (CH); Yvan Ferri, Lausanne (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 14/562,851

(22) Filed: Dec. 8, 2014

(65) Prior Publication Data

US 2015/0168178 A1 Jun. 18, 2015

(30) Foreign Application Priority Data

Dec. 13, 2013 (EP) .................................... 13197208

(51) Int. Cl.
| | |
|---|---|
| *H03M 1/22* | (2006.01) |
| *G04C 3/00* | (2006.01) |
| *G04B 27/02* | (2006.01) |
| *G01D 5/245* | (2006.01) |
| *G01D 5/347* | (2006.01) |

(52) U.S. Cl.
CPC ................ *G04C 3/007* (2013.01); *G01D 5/245* (2013.01); *G01D 5/3473* (2013.01); *G01D 5/34746* (2013.01); *G04B 27/02* (2013.01); *G04C 3/004* (2013.01)

(58) Field of Classification Search
CPC ..... A61K 38/47; A61K 9/0048; A61K 45/06; A61K 38/4886; G02C 7/047; G02C 7/04
USPC .......................................................... 341/10
See application file for complete search history.

(56) References Cited

U.S. PATENT DOCUMENTS

| | | | |
|---|---|---|---|
| 4,677,377 A | | 6/1987 | Takahashi et al. |
| 5,751,230 A | * | 5/1998 | Brandestini ..................... 341/10 |
| 6,252,825 B1 | | 6/2001 | Perotto |
| 2010/0142331 A1 | | 6/2010 | Kimura et al. |

FOREIGN PATENT DOCUMENTS

| | | |
|---|---|---|
| EP | 2 196 871 A2 | 6/2010 |
| WO | WO 01/22038 A1 | 3/2001 |

OTHER PUBLICATIONS

European Search Report issued Apr. 3, 2014 in European Application 13197208, filed on Dec. 13, 2013.

* cited by examiner

*Primary Examiner* — Jean B Jeanglaude
(74) *Attorney, Agent, or Firm* — Oblon, McClelland, Maier & Neustadt, L.L.P.

(57) ABSTRACT

The angular and axial position sensor arrangement includes several sensors arranged adjacently, and aligned parallel to the axis of an encoded member that is angularly and axially displaceable relative to the sensors. The encoded member includes N−1 axial detection encoded rings with value A along their entire circumference and includes an Nth axial detection encoded ring that is axially adjacent with value B, different from value A, along its entire circumference. The values of axial detection encoded rings are distinguishable by the sensors overlapping some axial detection encoded rings. The encoded member includes several angular detection encoded rings axially adjacent to the Nth axial detection encoded ring. The angular detection encoded rings include a coding pattern composed of A and B values along their circumference to determine angular position by some sensors overlapping them.

25 Claims, 9 Drawing Sheets

Fig. 6a
Fig. 6b
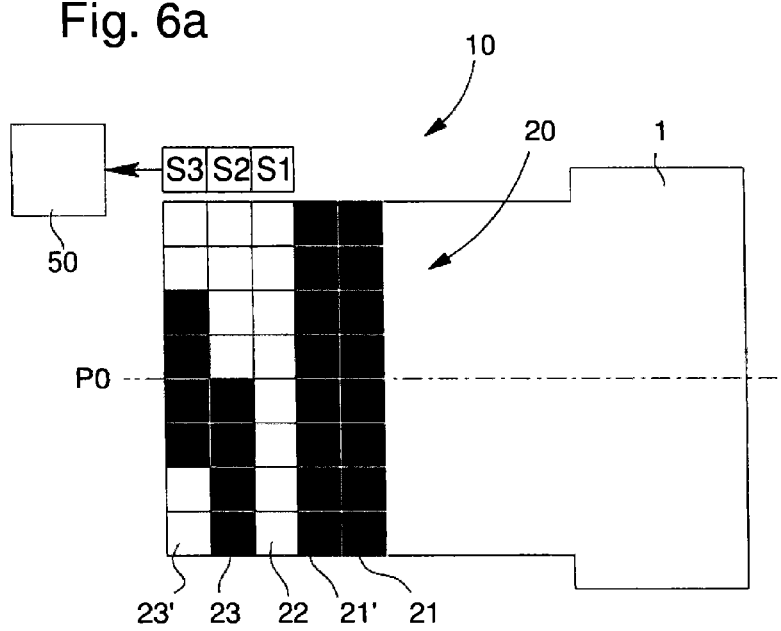
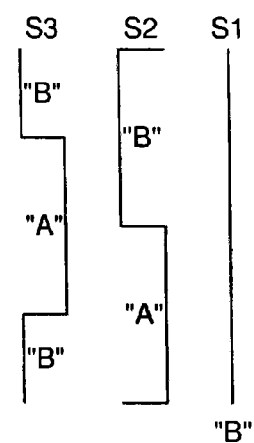

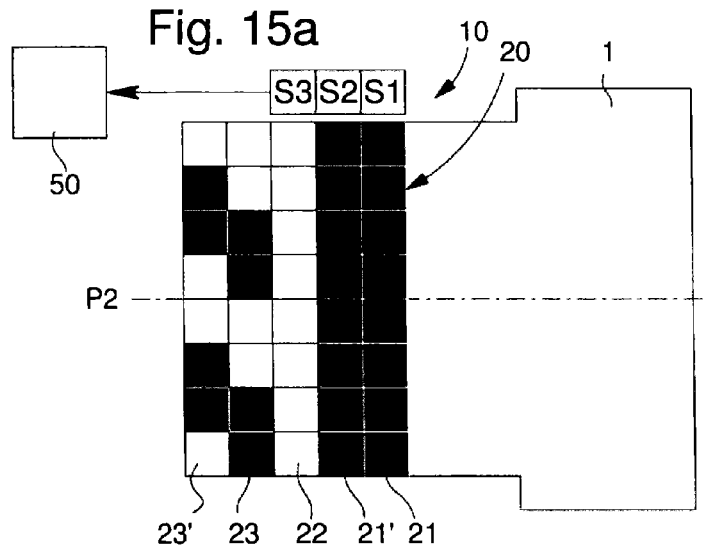
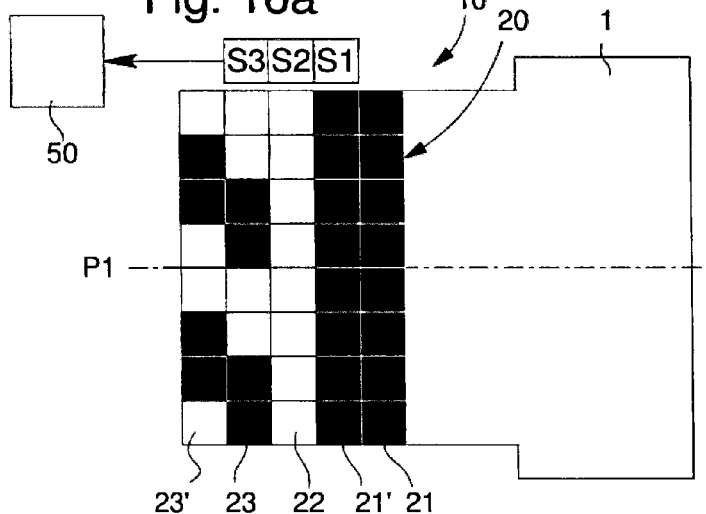
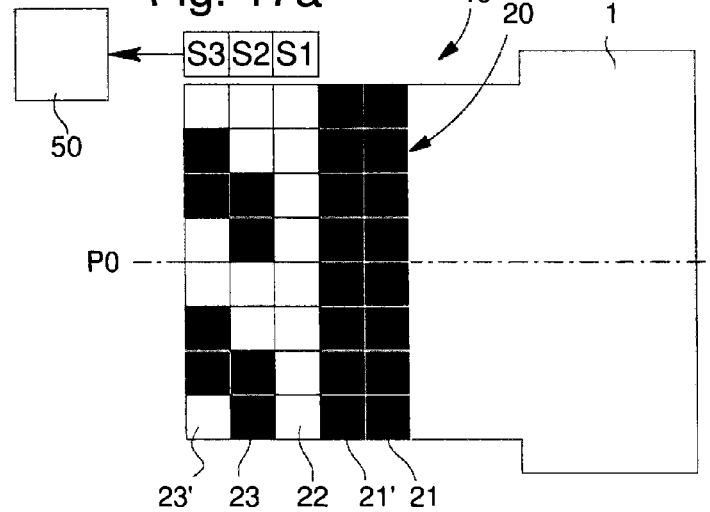

ANGULAR AND AXIAL POSITION SENSOR ARRANGEMENT

This application claims priority from European Patent Application No. 13197208.5 filed 13 Dec. 2013, the entire disclosure of which is incorporated herein by reference.

FIELD OF THE INVENTION

The present invention relates to a sensor arrangement adapted for detecting and determining angular as well as axial positions of an encoded member being rotatable as well as axially displaceable relative to a series of at least two sensors.

BACKGROUND AND PRIOR ART

Generally, incremental or absolute encoding schemes can be used to measure the angular position of a rotating device, such as a volume-control knob or the crown of an electronic watch. In many applications, such control elements are also axially displaceable in order to trigger or to activate various functions of a device. Therefore, it is also necessary to measure the axial position of the same knob or crown. In watch applications, the axial position of the crown is used to change the modes of the watch, such as show-time, adjust-date, and adjust-time, for example. If the crown is pulled out one discrete axial position to enter the adjust-date mode, angular rotation of the crown is then used to move from one day to the next. If the crown is pulled out two discrete axial steps, angular rotation of the crown will then be used to set the time.

With many prior art solutions for determining or measuring axial and angular positions, at least two separate sensor arrangements are required to measure the angular position on one hand and to measure the axial position on the other hand. Each of these measurement arrangements has its own design requirements in terms of volume and electrical connectivity.

In watch applications, volume is very limited. Therefore, a rather compact angular and axial sensor arrangement is highly desirable. In prior art solutions, at least two adjacent sensors relative to encoded rings placed on a rod ended by a crown are used in order to measure the angular position of said rod. Furthermore one or several sensors at the rod end inside the watch case are necessary to measure the axial position of said rod. So this sensor arrangement of the prior art occupies a large space inside the watch case, which is a drawback.

SUMMARY OF THE INVENTION

The purpose of the present invention is to provide a combined angular and axial position sensor arrangement that requires a minimum of space and computational power, which can be implemented in a robust way in electronic products, and which can be manufactured at reasonable cost.

In a first aspect the invention provides a sensor arrangement for measuring angular and axial positions. Said sensor arrangement includes two or more axially adjacent sensors and an encoded member that is angularly and axially displaceable relative to the sensors.

Said encoded member is constructed in such a way that the physical characteristics of certain regions of the encoder cause a sensor to sense one logical state, called logical state A. From this point on, to enhance the clarity of this text, we say said regions of the encoder are with value A, and said sensor detects or senses value A.

Said encoded member is constructed in such a way that the physical characteristics of the regions of the encoder that do not cause said sensor to detect logical state A, cause it to detect logical state B, different from logical state A. From this point on, to enhance the clarity of this text, we say said regions of the encoder are with value B, and said sensor detects or senses value B.

Value A read by a sensor could correspond to a high logic state such as binary 1. Value B read by a sensor could correspond to a low logic state such as binary 0. However one could also have binary 0 for value A and binary 1 for value B, as long as these two values are distinguishable.

Said encoder member includes N axial detection encoded rings, for which N−1 adjacent axial detection encoded rings are with value A along their entire circumference and the ultimate Nth encoded ring is with value B, different from value A, along its entire circumference. The number of sensors is selected greater than or equal to the number of axial detection encoded rings minus one. The sensors overlap said axial detection encoded rings to be able to distinguish N axial positions of the encoded member. In a first axial position the first sensor of the group of sensors is placed to overlap the first axial detection encoded ring, whereas in an Nth axial position the first sensor overlaps the Nth axial detection encoded ring. Here, and in what follows, to overlap means that the encoded ring is positioned in a way that the sensor is measuring the physical characteristic of some region of the given encoded ring. Typically this means that the sensor and the center of the specified encoded ring are located at the same axial position. Therefore, the sensor and encoded ring are in a sense opposite to one another, or aligned with one another, and the sensor can determine for each angular position the associated value A or B of the region of the ring that is to be measured.

Advantageously, a measurement unit is connected to the sensors to determine the axial position of the encoded member by counting, starting from the first sensor the number of A values detected by the sensors before the first B value.

Advantageously, the encoded member comprises one or more angular detection encoded rings axially adjacent to the Nth axial detection encoded ring of the N axial detection encoded rings. The angular detection encoded rings are configured with a coding pattern composed of values A and B varying along their circumference to permit the angular position to be determined when some sensors overlap the angular detection encoded rings.

The sensor arrangement can include first and second sensors placed parallel to the rotation axis of the encoded member, which can be angularly and axially displaceable relative to the first and second sensors. First and second axial detection encoded rings can be provided in order to determine two axial positions of the encoded member. One angular detection encoded ring is axially adjacent to the second axial detection encoded ring with a specific coding pattern with values A and B along its circumference in order to measure the angular position with the sensors.

Typically, first and second sensors are immobilized relative to a housing while the encoded member is angularly as well as axially displaceable relative to said housing. In this way, the encoded member is also rotatable as well as axially displaceable relative to the first and the second sensors.

Advantageously, the encoded member is typically of cylindrical or tubular shape and comprises a series of axial and angular detection encoded rings extending along the outer circumference of the encoded member. It is not necessary that these rings be physically separate from one another, but typically each ring will have physical characteristics such that it serves its purpose for either axial or angular position measurement as described here. The sensors should be arranged so that for all expected angular and axial positions the sensors will overlap detection encoded rings permitting the axial position of the encoded member to be determined, and providing information about the angular position of the encoded member as well.

The axial detection encoded rings are provided with a simple coding pattern. The first N−1 axial detection encoded rings entirely consist of value A, and the ultimate Nth axial detection encoded ring entirely consists of value B. This coding pattern permits the measurement of the axial position of the encoded member by the sensors.

In typical implementations the angular and axial position sensor arrangement comprises numerous sensors interacting with numerous encoded rings of the encoded member. In fact, a simple system providing angular and axial position detection is already operable and implementable using two sensors and at least three axially adjacent encoded rings of the encoded member. Angular resolution of such a sensor is rather poor but may be sufficient for a particular application scenario, e.g. when intended for setting the date of a watch.

Since the axial detection encoded rings form a rotation invariant axial pattern of the encoded member, the said pattern may be detected by an array of sensors aligned parallel to the encoded member. In this way, various sensors originally implemented for angular position determination may also serve to determine the axial position of the encoded member, making a separate axial detection arrangement unnecessary because the same sensors can be used to determine both the angular and the axial position of the encoded member. As a consequence, a respective angular and axial position sensor arrangement can be realized in a space- and cost-saving way.

According to an embodiment of the angular and axial position sensor arrangement the encoded member is axially displaceable in discrete steps, at least in one axial discrete step relative to at least two sensors. Axial displacement in discrete steps takes place with well-defined axial positions of the encoded member. In this way, the axial position of the encoded member may always be determined unambiguously from the first N−1 sensors and N axial detection encoded rings.

According to a further embodiment, the axial displacement step size of the encoded member corresponds to the axial width or to the axial separation of the axial or angular detection encoded rings. Moreover, the axial step size of the encoded member also corresponds to the respective axial distance or separation between the used sensors. If for instance in an initial configuration the first axial detection encoded ring radially overlaps the first sensor, a stepwise axial displacement of the encoded member may serve to transfer the first axial detection encoded ring to another sensor adjacent to the first sensor. Hence, the axial dimensions and the axial distance between axially adjacent sensors equal the axial dimensions and axial separation of the various axially adjacent encoded rings of the encoded member. Moreover, the step size according to which the encoded member is axially displaceable exactly matches with the axial dimensions and separation of axially adjacent sensors or of various encoded rings of the encoded member, respectively. In this way, in any discrete axial position of the encoded member, any encoded ring thereof unambiguously interacts with only one sensor and vice versa.

Advantageously the angular and axial position sensor arrangement is conceived to be mounted in an electronic watch to provide reliable measurement of the axial and angular position of a crown. The sensor arrangement can tolerate any mechanical play inherent in such an arrangement.

Accordingly and following a further embodiment the encoded member is axially displaceable from a default position to at least a first retracted position. Here the term of a retracted position is only exemplary. It is also conceivable that the encoded member is axially displaceable from a default or idle position to a depressed position. Moreover, it is also conceivable that the encoded member is displaceable from an idle or default position to both opposite axial positions. Hence, it may be depressed to a first axial position and it may also be retracted to an opposite axial position. In this way for instance, the encoded member may be displaced to three or four different axial positions, and for each of these positions an angular rotation of the encoded member may have a different functionality.

According to another embodiment the first sensor radially overlaps the first axial detection encoded ring when the encoded member is in a first axial position, which can be the depressed position or the default position. In this configuration the second or other sensors also radially overlap the other axial detection encoded rings. A measurement unit connected to the sensors is able to detect the number of A values detected by said sensors before the first B value for determining the axial position of the encoded member irrespective of the angular position of the encoded member.

Depending on the required number of axial positions and angular resolution, the combined angular and axial position sensor arrangement may comprise a large number of sensors. The encoded member typically comprises a larger number of axially adjacent encoded rings than there are sensors.

In general, the number of sensors should at least be equal to the number of axial positions of the encoded member minus one. In this way the characteristic axial encoding provided by the axial detection encoded rings can be used to distinguish all axial positions of the encoded member.

It is necessary to have at least one angular detection encoded ring in order to obtain some information about angular position. There is no upper limit, however, to the number of angular detection encoded rings.

Different coding patterns can be used for the angular detection encoding rings. An embodiment with one angular detection encoded ring could have value A on the angular detection encoded ring for all encoded member angles between 180 and 360 degrees, and value B on the angular detection encoded ring for all encoded member angles between 0 and 180 degrees. The said angular detection encoded ring would permit a rather low angular position resolution of one-half of one rotation of the encoded member, because knowledge of the value on the sensed region of the angular detection encoded ring would permit one to determine whether the angle of the encoded member is between 0 and 180 degrees, or between 180 and 360 degrees.

An embodiment with two angular detection encoded rings could have value A on the first angular detection encoded ring for all encoded member angles between 180 and 360 degrees, value B on the first angular detection encoded ring for all encoded member angles between 0 and 180 degrees, value A on the second angular detection encoded ring for all encoded member angles between 90 and 270 degrees, and value B for all other angles on the second angular detection encoded ring. The angular detection encoded rings using this code (which is a two-bit Gray code) would permit an angular position resolution of one-fourth of one rotation because knowledge of the value on the sensed region of the two angular detection encoded rings would permit one to determine whether the angle of the encoded member is between 0 and 90 degrees, between 90 and 180 degrees, between 180 and 270 degrees, or between 270 and 360 degrees.

An embodiment with three angular detection encoded rings would permit an angular position resolution of oneeighth of one rotation (45 degrees), using a three-bit Gray code, but other codes could also be used to obtain the same resolution.

Similarly, making use of four angular detection encoded rings allows an angular detection resolution of 22.5 degrees Advantageously the sensor arrangement also comprises a measurement unit that is coupled to the sensors to determine the encoded member's axial and angular position. The measurement unit may also be operable to indicate when there are changes in the signals generated by the sensors. In this way, the measurement unit may also be operable to determine whether the encoded member has been retracted or depressed from a default position into a retracted or depressed position. Apart from that, the measurement unit is operable to detect and to process the various signals that are producible by the various sensors during a rotation and/or axial displacement of the encoded member.

According to still another embodiment, pairs of sensors and corresponding encoded rings interact electrically, magnetically, capacitively or optically. When implemented electrically, first and second sensors may comprise conducting brushes that are in mechanical contact with the encoded rings of the encoded member. Here, the encoded rings comprise insulating and conducting sections. Depending on whether an insulating or conducting section of an encoded ring is in contact with a particular sensor, said sensor is operable to generate a corresponding signal representing the particular encoded section of the respective encoded ring. When implemented magnetically, the encoded rings may be permanently magnetized according to a predefined pattern. The same may also be conceivable when implemented capacitively. In an optical implementation, the sensors may comprise a light generating as well as a light sensitive element while respective sections on the particular encoded rings feature a different reflectivity.

According to another aspect the invention also relates to an electronic device featuring an angular and axial position sensor arrangement as described above. In particular, the invention relates to a watch, in particular to a wristwatch comprising an adjustment unit having at least one angular and axial position sensor arrangement as described above.

In still another aspect the invention also relates to a method of determining angular and axial position of an encoded member by means of a combined angular and axial position sensor arrangement as described above. Said method comprises the steps of receiving L signals from the L sensors and comparing L signals to at least determine the axial position of the encoded member, in which a measurement unit coupled to the sensors determines the axial position by counting, starting from the first sensor, the number of A values detected by the sensors before the first B value.

Apparently, said method is closely correlated to the configuration of the above described angular and axial position sensor. Depending on the actual sensor implementation, in particular depending on the number of sensors and encoded rings on the encoded member, the method is equally operable to determine not only the axial position but also the absolute angular position or incremental changes in the angular position of the encoded member.

In still another aspect, the invention relates to a computer program stored on a computer-readable medium such as a computer program product. Said computer program comprises program means for processing at least a first signal from the first sensor. The computer program further comprises program means for processing at least a second signal from the second sensor. Additionally, the computer program product comprises program means for comparing first and second signals to at least determine the encoded member's axial position. Typically, the program means are also adapted to compare and to process first and second signals in order to determine not only the axial position but also the angular position or incremental changes in the angular position of the encoded member.

In this context it is to be noted that all features, benefits and steps as described in connection with the angular and axial position sensor arrangement are equally valid for the method of determining angular and axial position of an encoded member as well as to the computer program product; and vice versa.

BRIEF DESCRIPTION OF THE DRAWINGS

The objects, advantages and features of the angular and axial position sensor arrangement will appear more clearly in the following description, given on the basis of non-limiting embodiments illustrated by the drawings, in which:

FIG. 6b is indicative of the signals of the sensors over a complete revolution of the encoded member according to FIG. 6a, FIG. 7a schematically shows a third embodiment of the angular and axial position sensor arrangement with the encoded member in a depressed position with respect to four sensors, FIG. 15b is indicative of the signals of the sensors over a complete revolution of the encoded member according to FIG. 15a, FIG. 16a schematically shows the fifth embodiment of the angular and axial position sensor arrangement with the encoded member in a default position, FIG. 16b is indicative of the signals of the sensors over a complete revolution of the encoded member according to FIG. 16a, FIG. 17a schematically shows the fifth embodiment of the angular and axial position sensor arrangement with the encoded member in a retracted position, and FIG. 17b is indicative of the signals of the sensors over a complete revolution of the encoded member according to FIG. 17a.

DETAILED DESCRIPTION

Figure 1A:
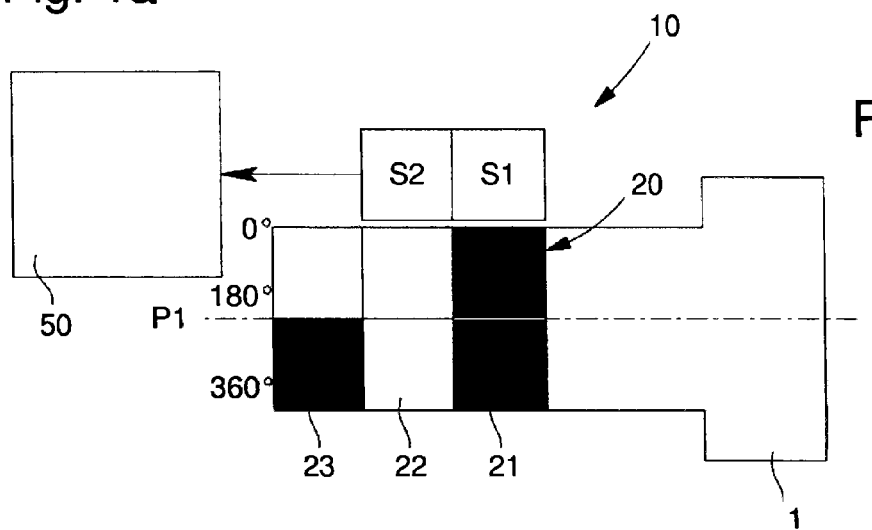
FIG. 1a schematically shows a first embodiment of the angular and axial position sensor arrangement with the encoded member in a default position with respect to two sensors.

In the following description, all the components of the angular and axial position sensor arrangement that are well known to those skilled in the art in this technical field will be described only in a simplified manner.

It will be noted that in the different embodiments described below the angular and axial position sensor arrangement includes L sensors, where L is a whole number greater than or equal to 2, and an encoded member, which can be rotated around an axis and displaced axially relative to the sensors.

The encoded member can be arranged on an angularly and axially displaceable element of an instrument. Said encoded member, which can be a rod ended by a crown of an instrument, such as a wristwatch, includes N axial detection encoded rings, which are axially adjacent, and where N is a whole number greater than or equal to 2, and M angular detection encoded rings, which are axially adjacent, and where M is a whole number greater than or equal to 1. The first N−1 axial detection encoded rings are defined with value A along their entire circumference and the Nth axial detection encoded ring is defined with value B, different from value A, along its entire circumference. The M angular detection encoded rings are axially adjacent to the Nth axial detection encoded ring, and each comprises a coding pattern consisting of values A and B along its circumference, permitting the determination of angular position by some sensors overlapping one or several angular detection encoded rings.

In order to determine the axial position of the encoded member, it is necessary to have a number L of sensors at least equal to the number N of axial detection encoded rings minus one, i.e. at least L=N−1 when the number N is at least 2. Generally the number L of sensors can be equal to or greater than the number N of axial detection encoded rings in order to use some sensors in a specific location to determine the angular position of the encoded member. The first sensor of the series of sensors can be displaceable from the first axial detection encoded ring to the Nth axial detection encoded ring for determining the axial position of said encoded member. Said axial position can be determined by a measurement unit connected to said sensors by counting, starting with the first sensor, the number of A values detected by the sensors before the first B value.

For the different embodiments described hereafter it can be provided that L and N are at least equal to 2 and M is at least equal to 1, or L and N can be equal to 3 or 4, and M can be equal to 2 or 3, or L is equal to 5, N is equal to 4 and M is equal to 4, but other values can be envisaged. Other embodiments can be provided for the angular and axial position sensor arrangement. For a better accuracy of the angular measurement the number M of angular detection encoded rings can be equal to 2 or greater than 2, with a specific code on the M angular detection encoded rings on M-bits by being all overlapped by the sensors.

Figure 2A:
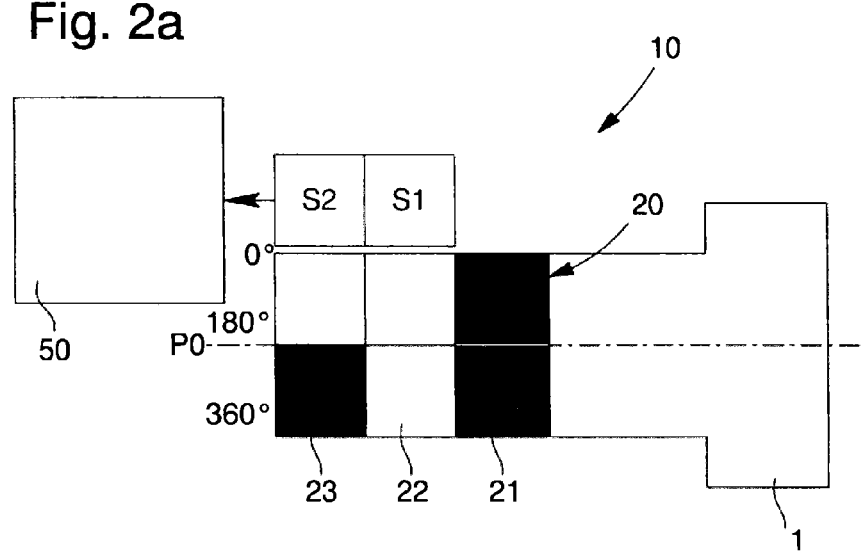
FIG. 2b is indicative of the signals of the sensors over a complete revolution of the encoded member according to FIG. 2a, FIG. 3 shows a tridimensional view of an encoded member of the first embodiment, which is a rod ended by a crown of an instrument, FIG. 4a schematically shows a second embodiment of the angular and axial position sensor arrangement with the encoded member in a depressed position with respect to three sensors.

In FIGS. 1a and 2a, a first and rather simple embodiment of the combined angular and axial position sensor arrangement 10 is illustrated. This sensor arrangement 10 comprises a first sensor S1 and a second sensor S2 that are fixedly arranged to each other, e.g. in or on a housing of a watch or some other type of device. The sensor arrangement 10 further comprises an encoded member 20, which is axially displaceable, i.e. from the left to the right or vice versa and which is rotatable along a central axis of rotation. Said encoded member 20 has a cylindrical or tubular shape. Preferably the two sensors S1 and S2 are aligned parallel to the encoded member. In the case of a watch, said encoded member 20 is a part of a rod ended by a crown 1 operated outside of the watch housing in order to control some functions or to set time and date of said watch.

In the initial configuration as illustrated in FIGS. 1a and 2a, the encoded member 20 comprises a first axial detection encoded ring 21, illustrated as the rightmost vertical stripe. The encoded member 20 further comprises a second axial detection encoded ring 22 as indicated by the central vertical stripe in FIGS. 1a and 2a. Moreover, the encoded member comprises an angular detection encoded ring 23 axially adjacent to the second axial detection encoded ring 22. In this first embodiment, the number N of axial detection encoded rings is two, and the number M of angular detection encoded ring is one.

As illustrated in FIGS. 1a and 2a, the first axial detection encoded ring 21 includes two sections each distributed on 180° of the circumference. Each of these sections is coded with value A, as indicated by illustrating them in black, to be detected by at least one sensor overlapping said first axial detection encoded ring 21. The second axial detection encoded ring 22 comprises two sections each distributed on 180° of the circumference and with value B shown by white sections. Given that the first and second axial detection encoded rings 21, 22 only have the value A along their entire circumference or the value B along their entire circumference, first and second axial detection encoded rings 21, 22 are rotation invariant. Given that only two axial detection angular encoded rings 21, 22 are provided in said first embodiment, it is possible to detect in principle two axial positions of said encoded member at least by the first sensor S1.

Figure 2B:
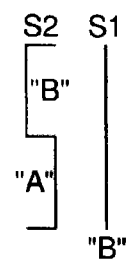
Figure 3:
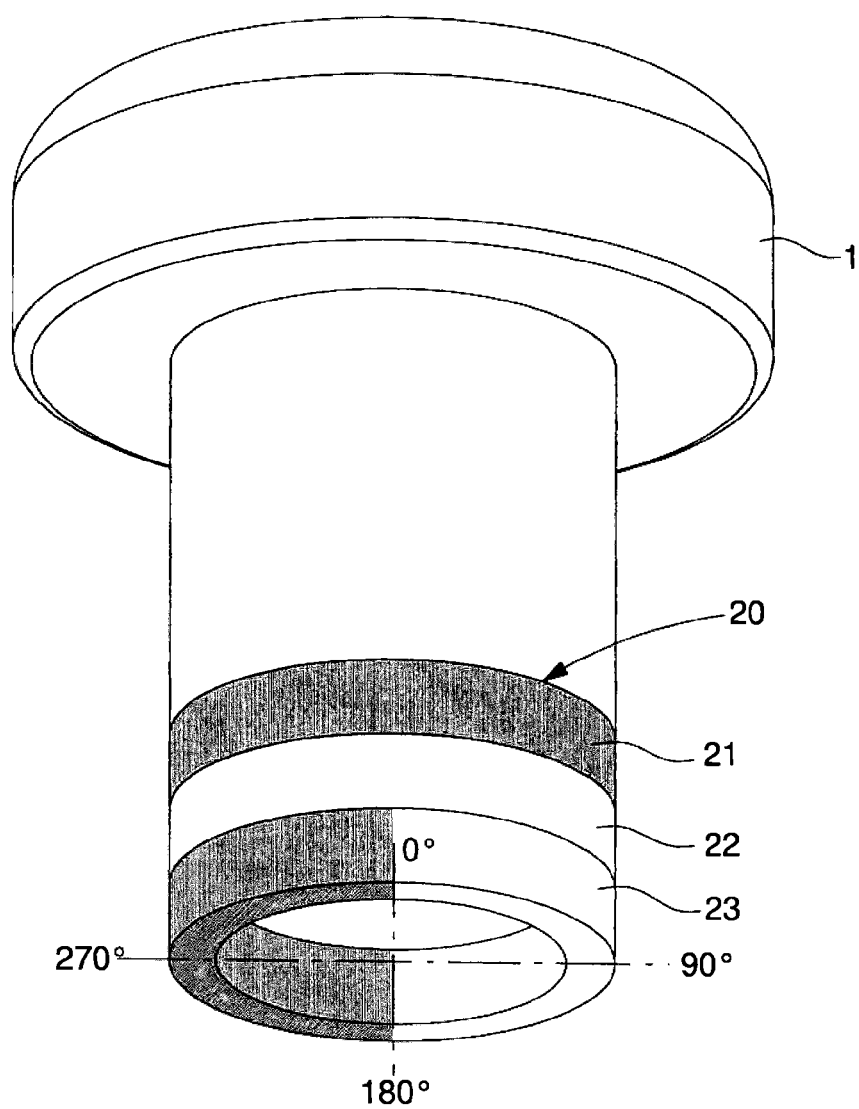

FIG. 3 shows a three-dimensional view of the encoded member 20 on a rod ended by a crown 1 that is represented in two-dimensions on FIGS. 1a and 2a. On the three-dimensional view of a cylinder, part of the surface of the cylinder is not visible because it is on the back side. Therefore, in order to clearly represent the entire surface of the cylinder on a two-dimensional view, it makes sense to imagine that one can unroll the surface of the cylinder as if one were unrolling a sheet of paper wrapped around the entire circumference of the cylinder. By comparing FIGS. 1a and 2a to FIG. 3, one realizes that FIGS. 1a and 2a are not a cross-section or a front view of the cylinder, but an unwrapped or unrolled representation of the surface of the cylinder that cannot be entirely seen on a three-dimensional figure. The axis of the cylinder is represented by the horizontal dashed line, which is the axis around which the cylindrical surface has been unwrapped or unrolled for the two-dimensional representation.

Figure 1B:
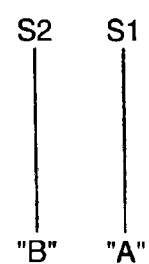
FIG. 1b is indicative of the signals of the sensors over a complete revolution of the encoded member according to FIG. 1a, FIG. 2a schematically shows the first embodiment of the angular and axial position sensor arrangement with the encoded member in a retracted position.

In the axial position as illustrated in FIG. 1a, which is a default position P1, the first sensor S1 will always detect value A on the first axial detection encoded ring 21, whereas the second sensor S2 will always detect value B on the second axial detection encoded ring 22. The information from the first sensor S1 alone is sufficient to determine the axial position of the encoded member. The signals from sensors S1 and S2 over a complete revolution of the encoded member 20 are shown in FIG. 1b. The first sensor S1 always detects value A, whereas the second sensor S2 always detects value B over a complete revolution of the encoded member 20.

In this particular configuration or axial position, the coding pattern of the angular detection encoded ring 23 of the encoded member 20 is not measured. However, it is conceivable that the sensor arrangement 10 could also comprise a third sensor axially adjacent to the second sensor S2 and being therefore operable to interact with the angular detection encoded ring 23 even in the axial position according to FIG. 1a.

The homogeneous axial detection encoded rings 21, 22 form a particular axial coding pattern of the encoded member 20, thereby indicating the actual axial position of the encoded member 20 relative to the position of first and second sensors S1, S2. A measurement unit 50 connected to said first and second sensors S1, S2 can determine the axial position of the encoded member 20 by counting, starting from the first sensor S1, the number of A values detected by the sensors before the first B value. In this case, only one A value is detected given that sensor S1 measures value A from the first axial detection encoded ring 21, and sensor S2 measures value B from the second axial detection encoded ring 22.

In FIG. 2a, a first retracted position P0 or axially displaced configuration is illustrated. By comparison with the configuration of FIG. 1a, it is apparent that the complete encoded member 20 has been axially displaced to the right by one discrete step. As shown in FIG. 2a, the second axial detection encoded ring 22 now radially overlaps the first sensor S1 while the angular detection encoded ring 23 radially overlaps the second sensor S2. Due to the axial displacement of the encoded member 20, the first sensor S1 detects a different signal thereby indicating a displaced axial position of the encoded member 20 compared to the initial configuration of FIG. 1a. In this case, the measurement unit 50 cannot count any A values before the first B value, given that the first sensor S1 measures a B value from the second axial detection encoded ring 22. In the first case of FIG. 1a, the measurement unit 50 has counted one A value from the first sensor S1, whereas in the second case of FIG. 2a, no A value is counted before the first B value starting from the first sensor S1.

During a rotation of the encoded member 20 around the crown axis of FIG. 2a, the first sensor S1 does not detect any changes since the second axial detection encoded ring 22 features only value B on its outer circumference. However, the angular detection encoded ring 23 causes a varying signal to be measured on the second sensor S2. Here, the coding pattern on the ring 23 is operable to alternately provide values A and B to the second sensor. In this way, angular position detection with a resolution of 180° is provided. The signals from sensors S1 and S2 over a complete revolution of the encoded member 20 are shown in FIG. 2b. While rotating the encoded member 20, the first sensor S1 always detects value B, whereas the second sensor S2 detects value B between 0° and 180° and value A between 180° and 360°.

With such a simple sensor arrangement the rotational speed of the encoded member 20 can be measured, but not the rotational direction given that only one signal is detected with two alternating values during a complete rotation. Said compact sensor arrangement allows one to measure the axial position of the encoded member 20 as well as the angular position of the encoded member 20 in one of the configurations.

In FIGS. 4a to 6a, a second embodiment of the combined angular and axial position sensor arrangement 10 is shown, in which three sensors S1, S2, S3 are arranged adjacently in a row of sensors. Said row of sensors S1, S2, S3 is aligned parallel to the axis of the encoded member. The encoded member 20 comprises three axial detection encoded rings 21, 21', 22 axially arranged, and two angular detection encoded rings 23, 23' axially arranged. First and second axial detection encoded rings 21, 21' are with value A along their entire circumference, whereas the third axial detection encoded ring 22 is with value B along its entire circumference. With these three axial detection encoded rings, the measurement unit 50 connected to the three sensors can determine three axial positions of the encoded member, from the first axial position where the first sensor S1 overlaps the first axial detection encoded ring 21 to the third axial position where the first sensor S1 overlaps the third axial detection encoded ring 22.

It is to be noted that only two sensors are necessary in this case to determine the three possible axial positions. In the first axial position, the first sensor S1 overlaps the first axial detection encoded ring 21 and in the third axial position, the first sensor S1 overlaps the third axial detection encoded ring 22.

The angular detection encoded rings 23, 23' are axially arranged adjacent to the third axial detection encoded ring 22. Said two angular detection encoded rings 23, 23' comprise a different coding pattern composed of A and B values along their circumference. Advantageously, the two angular detection encoded rings 23, 23' form a 2-bit Gray code. The angular measurement on 2 bits is performed in the third axial position of the sensors S1, S2, S3 as explained hereafter.

Figure 4A:
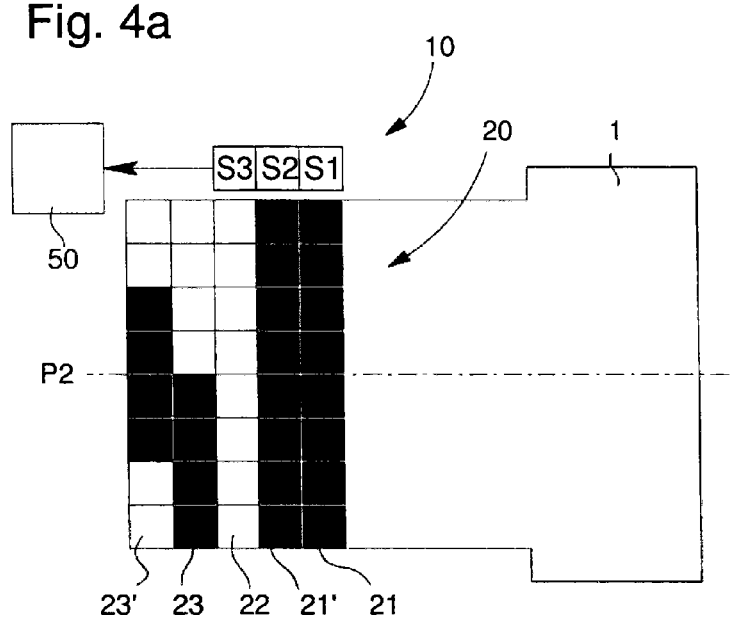
FIG. 4b is indicative of the signals of the sensors over a complete revolution of the encoded member according to FIG. 4a, FIG. 5a schematically shows the second embodiment of the angular and axial position sensor arrangement with the encoded member in a default position.

As illustrated in FIG. 4a, the encoded member 20 is in a depressed position P2. In the case of a watch, said encoded member is a part of a rod ended by a crown 1 operated outside of the watch housing to control some functions or to set time and date of said watch. The rod generally passes through the watch housing and is sealed in a conventional manner. According to an arrangement of said watch, it can be possible to provide said depressed position P2 by pressing on the crown 1 one step beyond a default position P1. The step corresponds to the width of each axial detection encoded ring 21, 21', 22.

In this depressed position P2, the first sensor S1 overlaps the first axial detection encoded ring 21, whereas the second and third sensors S2, S3 overlap the second and third axial detection encoded rings 21', 22. No angular position can be measured in this depressed position, but the measurement unit 50 connected to the three sensors can count two A values on the first and second axial detection encoded rings 21, 21', before the B value of the third axial detection encoded ring 22. In this way, the depressed position P2 can be identified by measuring the values from the first, second, and third sensors S1, S2, S3.

Figure 4B:
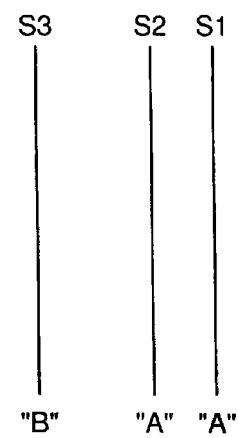

It is to be noted that in this configuration of FIG. 4a, the combined angular and axial position sensor arrangement 10 acts as a pure axial position sensor. Since any rotational movement of the encoded member 20 would have no effect on the signals to be generated by any one of the sensors S1, S2 or S3. In FIG. 4b the signals from sensors S1, S2 and S3 are shown over a complete revolution of the encoded member 20. The signal from the first and second sensors S1, S2 are always to the value A, whereas the signal from the third sensor S3 is always to the value B over a complete revolution of the encoded member 20.

Figure 5A:
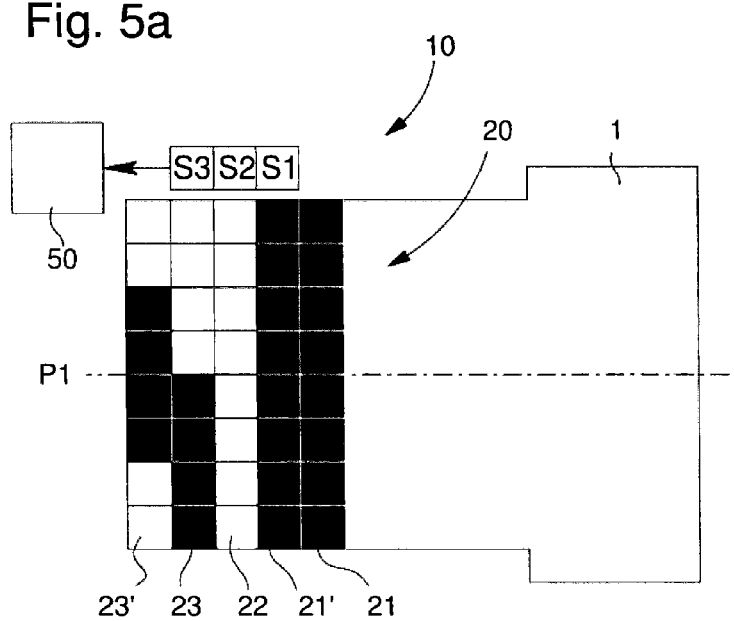
FIG. 5b is indicative of the signals of the sensors over a complete revolution of the encoded member according to FIG. 5a, FIG. 6a schematically shows the second embodiment of the angular and axial position sensor arrangement with the encoded member in a retracted position.

The situation changes with the configuration of FIG. 5a. Compared to the configuration of FIG. 4a, the encoded member 20 has been displaced to the right by one discrete step in a default position P1. The third sensor S3 overlaps the first angular detection encoded ring 23 and wherein the second sensor S2 overlaps the third axial detection encoded ring 22. In this default position P1, only one A value from the first sensor S1, which overlaps the second axial detection ring 21', is counted by the measurement unit 50 before detecting the B value of sensor S2. Said measurement unit 50 connected to the various sensors S1, S2, S3 is operable to detect such an axial displacement and is capable of determining that the encoded member 20 is now in position P1.

Figure 5B:
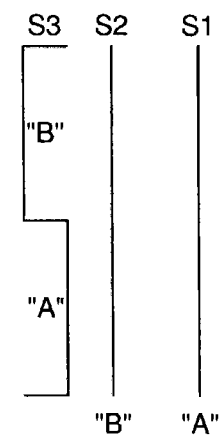

In FIG. 5a, the third sensor S3 is operable to generate a signal S3 shown in FIG. 5b in response to a complete revolution of the encoded member 20. In the upper part of said signal S3, value B is sensed by the measurement unit, whereas in the lower part of said signal S3, value A is sensed. As shown in FIG. 5b, the second sensor S2 always detects the value B, whereas the first sensor S1 always detects the value A.

As already described in connection with the configuration of FIGS. 1a and 2a, the combined angular and axial position sensor arrangement 10 may serve to detect incremental changes in the angular position, although the direction of rotation cannot be determined.

In FIG. 6a, the encoded member 20 is displaced one step further to the right to a retracted position P0. The first sensor S1 overlaps the third axial detection encoded ring 22. Again, the axial position P0 of the encoded member can be detected by the measurement unit 50 in a corresponding way as described above because no A values are counted before the first B value given that the first sensor detects the B value from the third axial detection encoded ring 22. Clearly the coding patterns of the first and second angular encoded rings 23, 23' now overlap the second and third sensors S2 and S3.

Consequently, as illustrated in FIG. 6b, two alternating signals S2, S3 are generated by said sensors S2, S3 during a complete revolution of the encoded member 20. Since the coding patterns of the first and second angular encoded rings 23, 23' are circumferentially offset the measurement unit 50 is operable to determine the sense of rotation of the encoded member 20 relative to the row of sensors S1, S2, S3. In this configuration, these signals S2, S3 are identical to those originating from a standard incremental encoder given that the signal S2 is phase shifted by 90° with respect to the signal S3. The first sensor S1 always detects the value B as shown in FIG. 6b.

In FIGS. 7a to 10a, a third embodiment of the combined angular and axial position sensor arrangement 10 is shown, in which four sensors S1, S2, S3 and S4 are arranged adjacently in a row of sensors. Said row of sensors S1, S2, S3, S4 is aligned parallel to the axis of the encoded member 20. The encoded member comprises four axial detection encoded rings 21, 21', 21", 22 axially arranged, and also three angular detection encoded rings 23, 23', 23" axially arranged. First, second and third axial detection encoded rings 21, 21', 21" are with value A along their entire circumference, whereas the fourth axial detection encoded ring 22 is with value B along its entire circumference. With these four axial detection encoded rings, the measurement unit 50 connected to the sensors can determine four axial positions of the encoded member, from the first axial position where the first sensor S1 overlaps the first axial detection encoded ring 21 to the fourth axial position where the first sensor S1 overlaps the fourth axial detection encoded ring 22.

The angular detection encoded rings 23, 23', 23" are axially arranged adjacent to the fourth axial detection encoded ring 22. Said three angular detection encoded rings 23, 23', 23" comprise a different coding pattern composed of A and B values along their circumference. Advantageously, the three angular detection encoded rings 23, 23', 23" form a 3-bit Gray code. The angular measurement on 3 bits is performed in the fourth axial position of the sensors S1, S2, S3, S4 as explained hereafter.

Figure 7A:
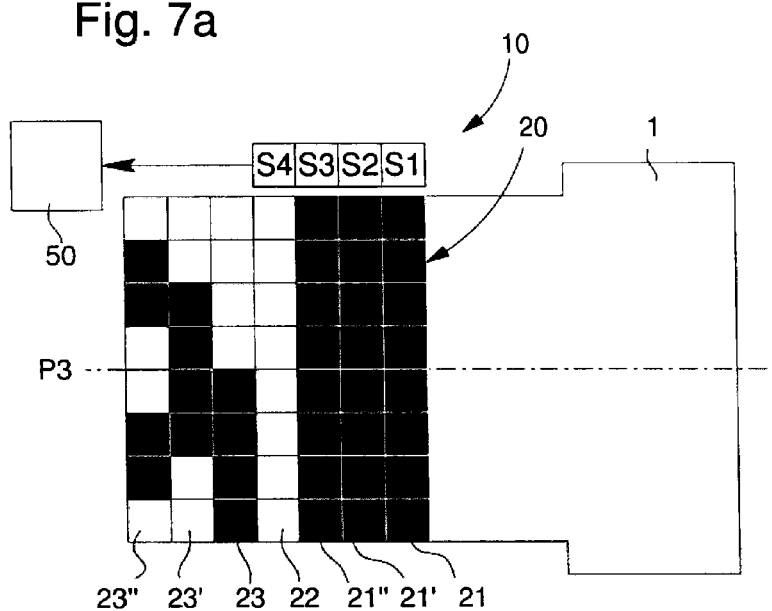
FIG. 7b is indicative of the signals of the sensors over a complete revolution of the encoded member according to FIG. 7a, FIG. 8a schematically shows the third embodiment of the angular and axial position sensor arrangement with the encoded member in a default position.

As illustrated in FIG. 7a, the encoded member 20 is in a depressed position P3. In the case of a watch, said encoded member is a part of a rod ended by a crown 1 operated outside of the watch housing in order to control some functions or to set the time and date of said watch. The rod generally passes through the watch housing and is sealed in a conventional manner. According to an arrangement of said watch, it can be possible to provide said depressed position P3 by moving the crown 1 one step beyond the default position P2. The step corresponds to the width of each axial detection encoded ring 21, 21', 21", 22.

In this depressed position P3, the first sensor S1 overlaps the first axial detection encoded ring 21, whereas the second, third and fourth sensors S2, S3, S4 overlap the second, third and fourth axial detection encoded rings 21', 21", 22. The angular position cannot be measured in this depressed position, but the measurement unit 50 connected to the four sensors can identify the axial position P2 by counting three A values on the first, second and third axial detection encoded rings 21, 21', 21", before the B value of the fourth axial detection encoded ring 22.

Figure 7B:
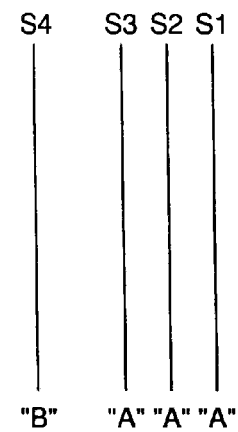

It is to be noted that in this configuration of FIG. 7a, the combined angular and axial position sensor arrangement 10 acts as a pure axial position sensor, since any rotational movement of the encoded member 20 would have no effect on the signals to be generated by any one of the sensors S1, S2, S3 or S4. In FIG. 7b, the signals from sensors S1, S2, S3 and S4 are shown over a complete revolution of the encoded member 20. The first, second and third sensors S1, S2, S3 always detect value A, whereas the fourth sensor S4 always detects value B over a complete revolution of the encoded member 20.

Figure 8A:
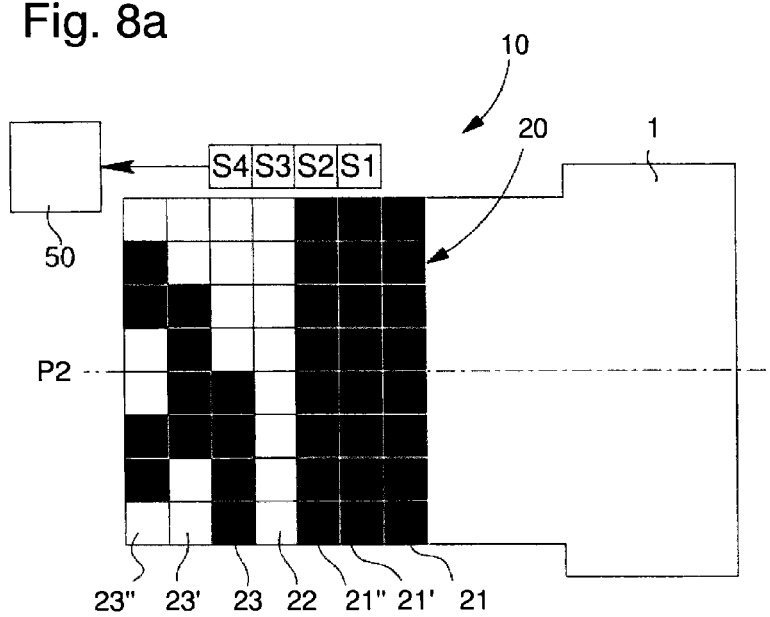
FIG. 8b is indicative of the signals of the sensors over a complete revolution of the encoded member according to FIG. 8a, FIG. 9a schematically shows the third embodiment of the angular and axial position sensor arrangement with the encoded member in a first retracted position.

The situation changes with the configuration of FIG. 8a. Compared to the configuration of FIG. 7a, the encoded member 20 has been displaced to the right by one discrete step to a default position P2. Sensor S4 overlaps with the first angular detection encoded ring 23 and the third sensor S3 overlaps with the fourth axial detection encoded ring 22. In this position, only two A values from the first and second sensors S1 and S2, overlapping second and third axial detection rings 21' and 21", can be counted by the measurement unit 50 before detecting the B value of sensor S3. Said measurement unit 50 connected to the various sensors S1, S2, S3, S4 is operable to detect such an axial displacement and is capable of determining that the encoded member 20 is now in position P2.

Figure 8B:
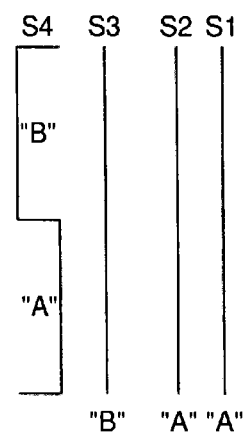

In the configuration of FIG. 8a, the fourth sensor S4 is operable to generate a signal S4 shown in FIG. 8b in response to a complete revolution of the encoded member 20. In the upper part of said signal S4, value B is sensed by the measurement unit, whereas in the lower part of said signal S4, value A is sensed. As shown in FIG. 8b, the third sensor S3 always detects value B, whereas the first and second sensors S1, S2 always detect value A. As described above for the first and second embodiments, the combined angular and axial position sensor arrangement 10 may serve to detect changes in the angular position, although the direction of rotation cannot be determined.

Figure 9A:
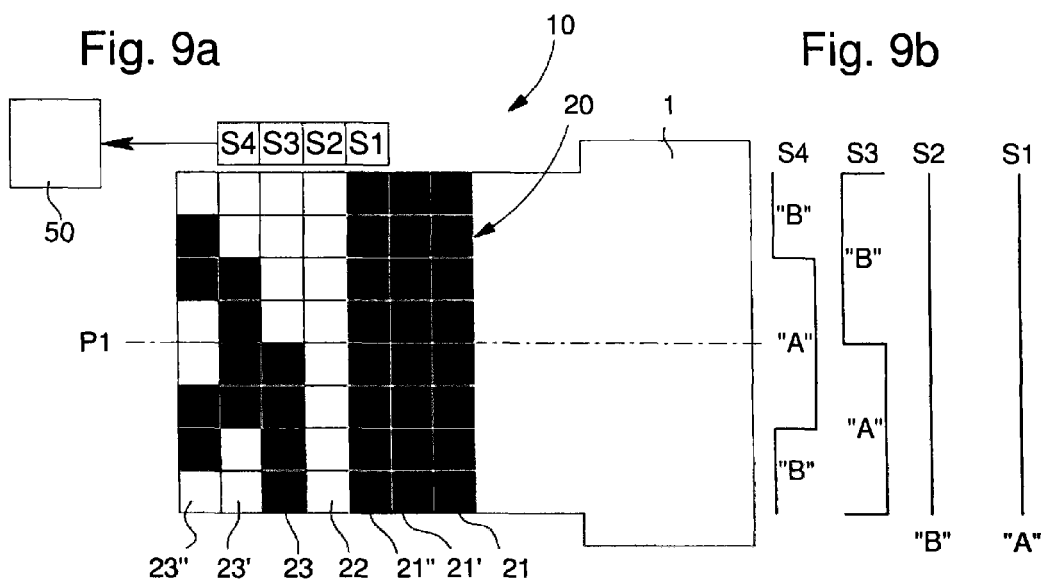
FIG. 9b is indicative of the signals of the sensors over a complete revolution of the encoded member according to FIG. 9a, FIG. 10a schematically shows the third embodiment of the angular and axial position sensor arrangement with the encoded member in a second retracted position.

In FIG. 9a, the encoded member 20 is displaced one step further to the right to a first retracted position P1. The first and second sensors S1, S2 respectively overlap the third and fourth axial detection encoded rings 21", 22. Again, the axial position P1 of the encoded member can be detected by the measurement unit 50 in a corresponding way as described above by counting only one A value from the third axial detection encoded ring 21" before the first B value from the fourth axial detection encoded ring 22. Clearly the coding patterns of the first and second angular encoded rings 23, 23' now overlap with the third and fourth sensors S3 and S4.

Figure 9B:
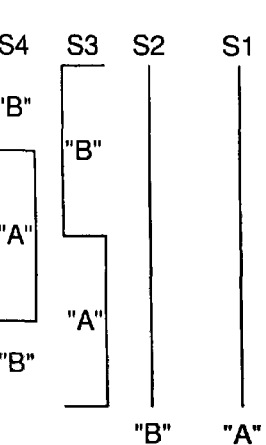

As a consequence and as illustrated in FIG. 9b two alternating signals S3, S4 are generated by said sensors S3, S4 during a complete revolution of the encoded member 20. Since the coding patterns of the first and second angular encoded rings 23, 23' are circumferentially offset the measurement unit 50 is operable to detect changes in the angular position and determine the sense of rotation of the encoded member 20 relative to the row of sensors S1, S2, S3, S4. One can see that not only are the three angular encoded rings 23, 23', 23" coded with a 3-bit Gray code, but the two angular encoded rings 23, 23' are coded with a 2-bit Gray code. Therefore, in the configuration as illustrated in FIG. 9a, an absolute measurement of the angular position of the encoded member can be obtained with a resolution of 90°. These signals S3, S4 are also identical to those originating from a standard incremental encoder given that the signal S3 is phase shifted by 90° with respect to the signal S4. As illustrated in FIG. 9b, the second sensor S2 always detects the value B, whereas the first sensor S1 always detects the value A.

Figure 10A:
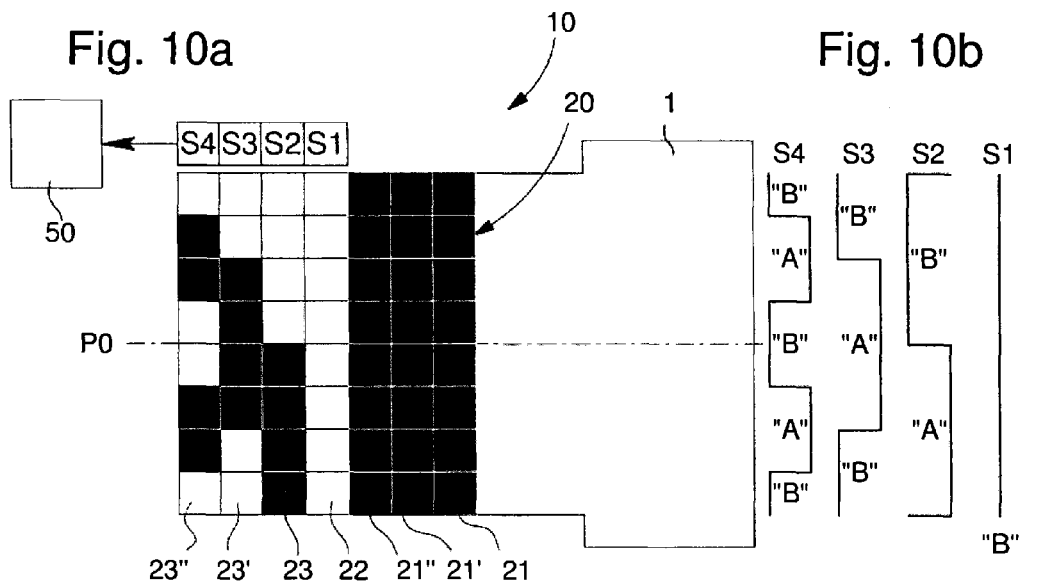
FIG. 10b is indicative of the signals of the sensors over a complete revolution of the encoded member according to FIG. 10a, FIG. 11a schematically shows a fourth embodiment of the angular and axial position sensor arrangement with the encoded member in a depressed position with respect to five sensors.

In the configuration as illustrated in FIG. 10a, the encoded member 20 has been moved to a second retracted position P0. In this position P0, the first sensor S1 overlaps the fourth axial detection encoded ring 22 having value B, whereas the second, third and fourth sensors S2, S3, S4 respectively overlap the first, second and third angular detection encoded rings 23, 23', 23". The measurement unit 50 counts no A values before the first B value of axial detection encoded ring 22, thus identifying the position P0.

Figure 10B:
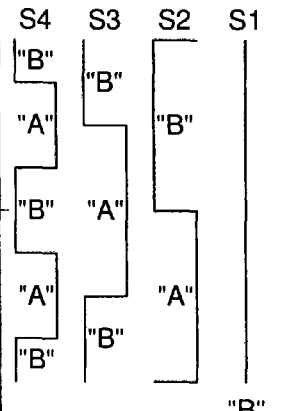

As shown in FIG. 10b, three changing signals S2, S3, S4 are generated during a complete rotation of the encoded member 20 respectively by the second, third and fourth sensors S2, S3, S4. The signal from the first sensor S1 is kept constant with value B. Said respective sensor signals S2, S3, S4 can represent a three-bit number and thus allow the angular position of the encoded member to be divided into eight discrete angular sections, each representing an angular range of 45°. Advantageously, a Gray code is used given that only one signal changes of state at each step of rotation. Furthermore with a Gray code used on three bits with the first, second and third angular detection encoded rings 23, 23', 23" on the complete circumference of the encoded member 20, we obtain a measurement of absolute angle with eight homogeneous positions per rotation.

In FIGS. 11a to 14a, a fourth embodiment of the combined angular and axial position sensor arrangement 10 is shown, in which five sensors S1, S2, S3, S4 and S5 are arranged adjacently in a row of sensors. Said row of sensors S1, S2, S3, S4, S5 is aligned parallel to the axis of the encoded member 20. The encoded member comprises four axial detection encoded rings 21, 21', 21", 22 axially arranged to determine four axial positions of the encoded member, and four angular detection encoded rings 23, 23', 23", 23''' axially arranged. First, second and third axial detection encoded rings 21, 21', 21" are with value A along their entire circumference, whereas the fourth axial detection encoded ring 22 is with value B along its entire circumference.

As previously explained for determining four axial positions P3, P2, P1 and P0, the first sensor S1 from the four sensors S1, S2, S3, S4 overlaps the first axial detection encoded ring 21 in the axial position P3, whereas the first sensor S1 overlaps the fourth axial detection encoded ring 22 in the axial position P0.

Figure 11A:
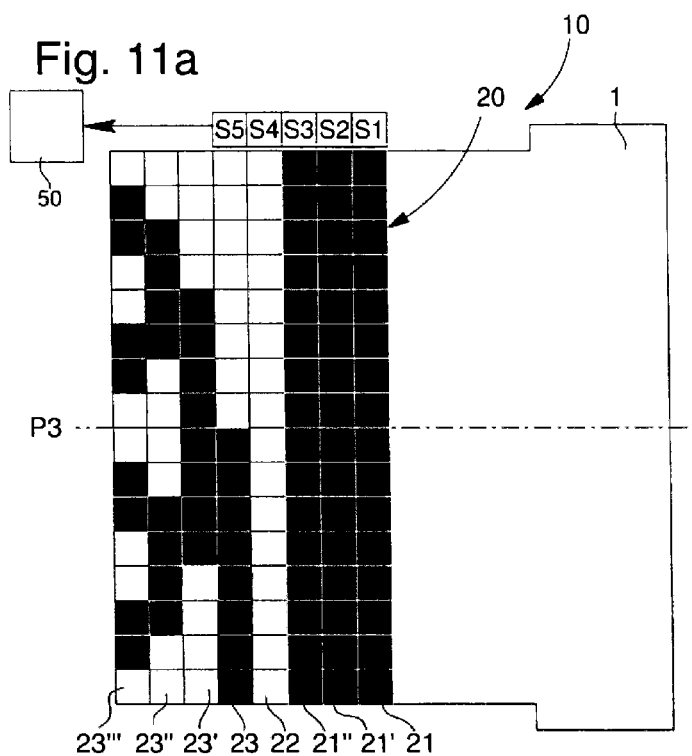
FIG. 11b is indicative of the signals of the sensors over a complete revolution of the encoded member according to FIG. 11a, FIG. 12a schematically shows the fourth embodiment of the angular and axial position sensor arrangement with the encoded member in a default position.
Figure 11B:
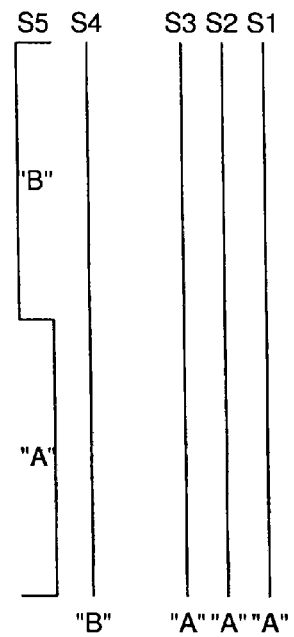

In FIG. 11a, the encoded member 20 is in a depressed position P3. In this depressed position P3, the first sensor S1 overlaps the first axial detection encoded ring 21, whereas the second, third, fourth and fifth sensors S2, S3, S4, S5 overlap the second, third and fourth axial detection encoded rings 21', 21", 22, and the first angular detection encoded ring 23. Unlike the third embodiment, in the depressed position P3 a fifth sensor S5 is operable to generate a signal S5 shown in FIG. 11b in response to a complete revolution of the encoded member 20. Furthermore the signals from sensors S1, S2, S3 and S4 are also shown over a complete revolution of the encoded member 20. The first, second and third sensors S1, S2, S3 always detect value A, whereas the fourth sensor S4 always detects value B over a complete revolution of the encoded member 20. As already described in the first, second and third embodiments, the combined angular and axial position sensor arrangement 10 may serve to detect changes in the angular position, although the direction of rotation cannot be determined.

The measurement unit 50 connected to the five sensors S1, S2, S3, S4, S5 can count three A values on the first, second and third axial detection encoded rings 21, 21', 21", before detecting the B value on the fourth axial detection encoded ring 22. In this way, the depressed position P3 can be identified by said values.

Figure 12A:
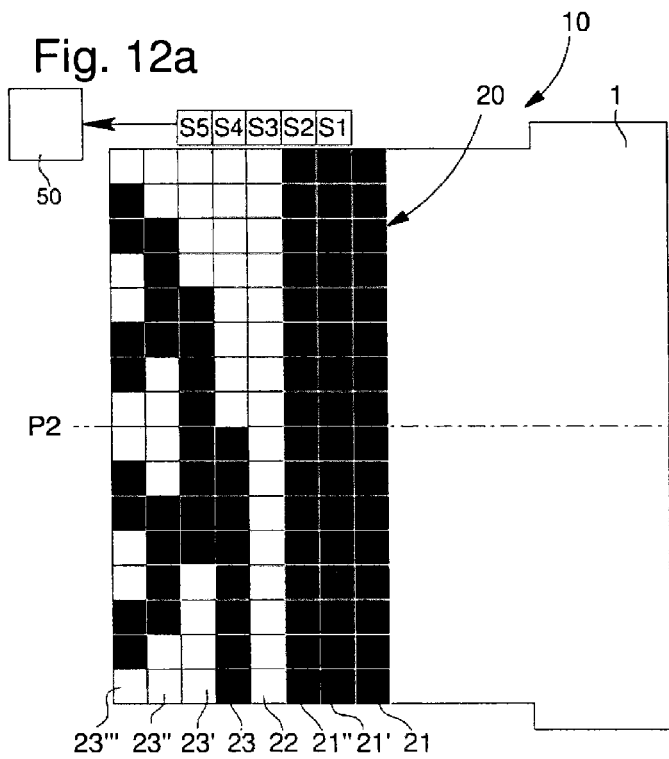
FIG. 12b is indicative of the signals of the sensors over a complete revolution of the encoded member according to FIG. 12a, FIG. 13a schematically shows the fourth embodiment of the angular and axial position sensor arrangement with the encoded member in a first retracted position.

In FIG. 12a, the encoded member 20 is displaced one step further to the right to the default position P2. The first and second sensors S1, S2 respectively overlap the second and third axial detection encoded rings 21', 21", whereas the third sensor S3 overlaps the fourth axial detection encoded ring 22. Again, the axial position P2 of the encoded member can be detected by the measurement unit 50 as described above by counting two A values from the second and third axial detection encoded rings 21' and 21" before the B value from the axial detection encoded ring 22. Clearly, the coding patterns of the first and second angular encoded rings 23, 23' now overlap the fourth and fifth sensors S4 and S5.

Figure 12B:
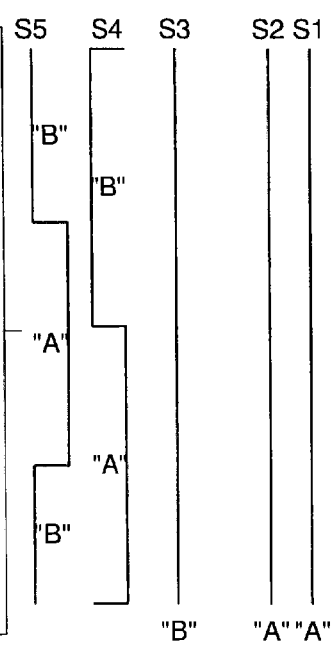

As a consequence and as illustrated in FIG. 12b two alternating signals S4, S5 are generated by said sensors S4, S5 during a complete revolution of the encoded member 20, whereas the signals from the first and second sensors S1, S2 are with the value A and the signal from the third sensor S2 is with the value B. One can see that not only are the four angular encoded rings 23, 23', 23",23''' coded with a 4-bit Gray code, but the two angular encoded rings 23, 23' are coded with a 2-bit Gray code. Therefore, in the configuration as illustrated in FIG. 9a, an absolute measurement of the angular position of the encoded member can be obtained with a resolution of 90°. These signals S4, S5 are also identical to those originating from a standard incremental encoder given that the signal S4 is phase shifted by 90° with respect to the signal S5.

Figure 13A:
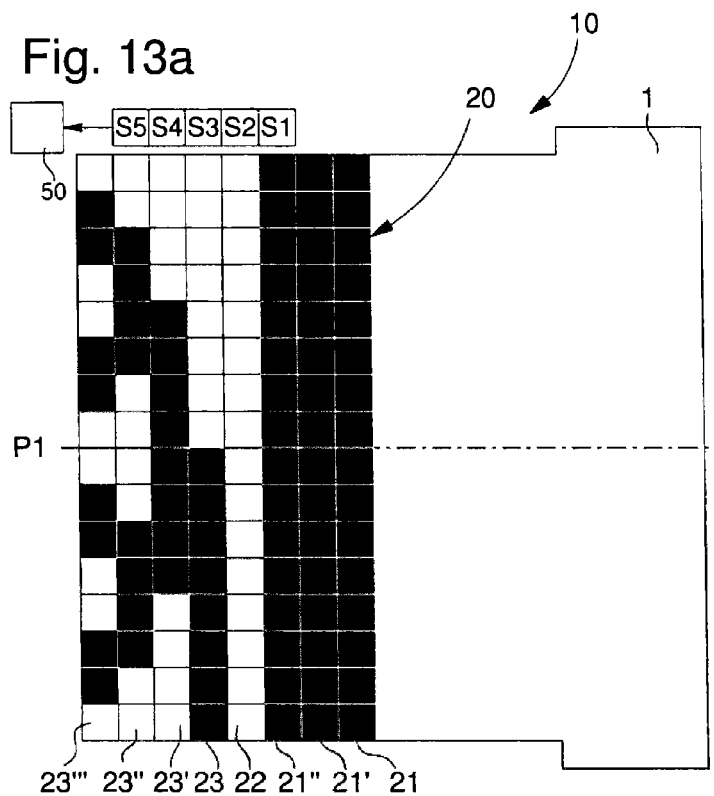
FIG. 13b is indicative of the signals of the sensors over a complete revolution of the encoded member according to FIG. 13a, FIG. 14a schematically shows the fourth embodiment of the angular and axial position sensor arrangement with the encoded member in a second retracted position.
Figure 13B:
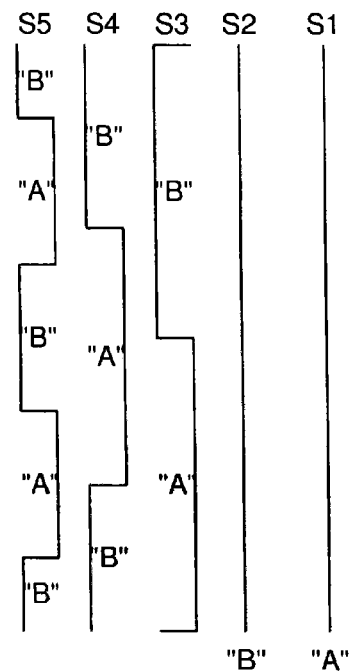

In the configuration as illustrated in FIG. 13a, the encoded member 20 is positioned at a first retracted position P1. In this first retracted position P1, the first sensor S1 overlaps the third axial detection encoded ring 21" having value A, whereas the second sensor S2 overlaps the fourth axial detection encoded ring 22 having value B. The third, fourth and fifth sensors S3, S4, S5 respectively overlap the first, second and third angular detection encoded rings 23, 23', 23". The measurement unit 50 counts only one A value before the first B value, thus identifying said first retracted position P1.

One can see that in the configuration as illustrated in FIG. 13a the three angular encoded rings 23, 23', 23" are coded with a 3-bit Gray code. Therefore, an absolute measurement of the angular position of the encoded member can be obtained with a resolution of 90° by measuring the three signals S3, S4, and S5. Depending on the application, or depending on limitations in manufacturing technology, a different code such as the simpler code of a standard incremental encoder can be used.

Figure 14A:
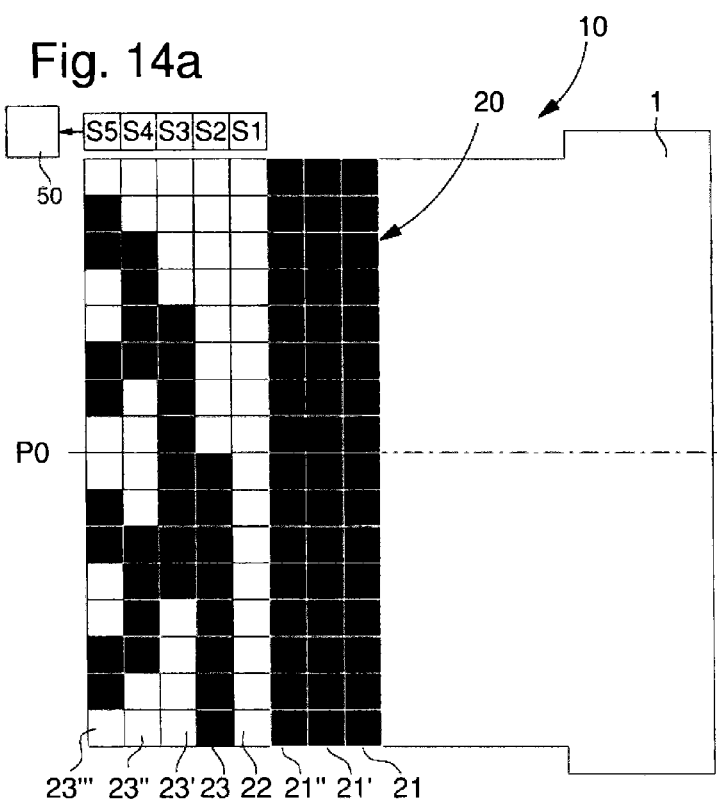
FIG. 14b is indicative of the signals of the sensors over a complete revolution of the encoded member according to FIG. 14a, FIG. 15a schematically shows a fifth embodiment of the angular and axial position sensor arrangement with the encoded member in a depressed position with respect to three sensors.

In the configuration as illustrated in FIG. 14a, the encoded member 20 has been retracted into a second retracted position P0. In this second retracted position P0, the first sensor S1 overlaps the fourth axial detection encoded ring 22 having value B, whereas the second, third, fourth and fifth sensors S2, S3, S4, S5 respectively overlap the first, second, third and fourth angular detection encoded rings 23, 23', 23", 23'''. The measurement unit 50 counts no A values before sensor S1 detects the B value of axial detection encoded ring 22, thus identifying the second retracted position P0.

Figure 14B:
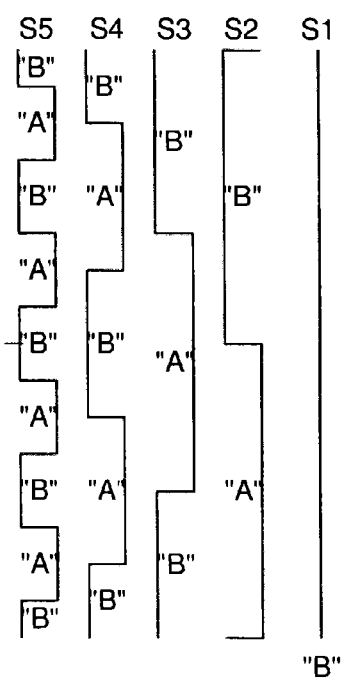

As shown in FIG. 14b, four signals S2, S3, S4, S5 are generated during a complete rotation of the encoded member 20 respectively by the second, third, fourth and fifth sensors S2, S3, S4, S5, whereas the signal from the first sensor S1 is with the value B. Said respective sensor signals S2, S3, S4, S5 represent a four-bit number and thus allow dividing the angular position of the encoded member into sixteen discrete angular sections, each representing an angular range of 22.5°. Preferably a Gray code can be used to obtain an absolute measurement of the angular position of the encoded member, with sixteen homogeneous positions per rotation. As mentioned above, a different code is also possible, but due to the nature of this Gray code the measurement resolution gets better with each shift of the encoded member from position P3 to P0, passing through positions P1 and P0.

It is to be noted, that all embodiments as illustrated in FIGS. 1a to 14b provide a mechanically simple and compact solution, wherein up to four absolute axial positions of the encoded member 20 relative to a series of sensors S1, S2, S3, S4, S5 can be determined. The resolution of the angular measurement may vary with the axial position of the encoded member 20. If a Gray code is used as in FIGS. 1a to 14b, the instantaneous angular position of the encoded member is unambiguously determined by the measurement of the code on at least the first angular detection encoded ring 23. Nevertheless, if no other signals are measured the resolution is quite poor, only indicating whether the angle is between 0 and 180° or between 180° and 360°. The resolution increases as additional codes are measured, and for a fully retracted configuration the resolution might be quite high. Not all codes, however, provide an unambiguous measurement of the angular position. If the code of a standard incremental encoder is used, the measured signals might be identical for several different angles of the encoded member. In such a case, angular position information can be lost if the sampling frequency of the measurement unit is not quite high. When a Gray code is used, reasonable computational demands for the measurement unit 50 are sufficient to provide both angular and axial position detection.

In FIGS. 15a to 17a, a fifth embodiment of the combined angular and axial position sensor arrangement 10 is shown, in which three sensors S1, S2, S3 are arranged adjacently in a row of sensors as described in the second embodiment. Said three sensors S1, S2, S3 are aligned parallel to the encoded member. The encoded member 20 comprises three axial detection encoded rings 21, 21', 22 axially arranged, and two angular detection encoded rings 23, 23' axially arranged. First and second axial detection encoded rings 21, 21' are with value A along their entire circumference, whereas the third axial detection encoded ring 22 is with value B along its entire circumference. With these three axial detection encoded rings, the measurement unit 50 connected to the three sensors can determine three axial positions of the encoded member, from the first axial position where the first sensor S1 overlaps the first axial detection encoded ring 21 to the third axial position where the first sensor S1 overlaps the third axial detection encoded ring 22.

The angular detection encoded rings 23, 23' are axially arranged adjacent to the third axial detection encoded ring 22. Said two angular detection encoded rings 23, 23' comprise a different coding pattern composed of A and B values along their circumference.

In this fifth embodiment, the code used is similar to that of the second embodiment shown in FIGS. 4a to 6a. Unlike the latter embodiment, the specific code defined on the angular detection encoded rings has been repeated twice around the cylinder of the encoded member 20, i.e. a first time on 0° and 180° and a second time on 180° and 360°. In general, any code can be repeated R times with R greater than 1 over the complete revolution of the encoded member 20. The advantage to repeating a code several times is that it increases the measurement resolution without increasing the number of sensors. The disadvantage is that over several distinct angular intervals the signals measured by the sensors are the same, so the measurement unit 50 must measure the angular position at least 2·R times per revolution in order to fulfill the condition of no lost angular position information when the crown makes several full revolutions per second. A direct measurement of absolute angle is no longer possible.

As illustrated in FIG. 15a, the encoded member 20 is in a depressed position P2. In this depressed position P2, the first sensor S1 overlaps the first axial detection encoded ring 21, whereas the second and third sensors S2, S3 overlap the second and third axial detection encoded rings 21', 22. No angular position can be provided in this depressed position, but the measurement unit 50 connected to the four sensors can count two A values on the first and second axial detection encoded rings 21, 21', before the B value of the third axial detection encoded ring 22. In this way, the depressed position P2 can be identified by measuring the values from the first, second, and third sensors S1, S2, S3.

In FIG. 15b the signals from sensors S1, S2 and S3 are shown over a complete revolution of the encoded member 20. The first and second sensors S1, S2 always detect value A, whereas the third sensor S3 always detects value B over a complete revolution of the encoded member 20.

The situation changes with the configuration of FIG. 16a. Compared to the configuration of FIG. 15a, the encoded member 20 has been displaced to the right by one discrete step in a default position P1. The third sensor S3 overlaps the first angular detection encoded ring 23 and the second sensor S2 overlaps the third axial detection encoded ring 22. In this default position P1, only one A value from the first sensor S1, which overlaps the second axial detection rings 21', is counted by the measurement unit 50 before detecting the B value of sensor S2. Said measurement unit 50 connected to the various sensors S1, S2, S3 is operable to detect such an axial displacement and is capable of determining that the encoded member 20 is now in position P1.

In FIG. 16a, the third sensor S3 is operable to generate a signal S3 shown in FIG. 16b in response to a complete revolution of the encoded member 20. Said signal S3 changes 4 times per revolution given that the specific code is repeated 2 times around the encoded member with a succession of values B, A, B, then A from the upper part to the lower part. As shown in FIG. 16b, the second sensor S2 always detects value B, whereas the first sensor S1 always detects value A. In this case, the combined angular and axial position sensor arrangement 10 may serve to detect incremental changes in the angular position, although the direction of rotation cannot be determined.

In FIG. 17a, the encoded member 20 is displaced one step further to the right to the retracted position P0. The first sensor S1 overlaps the third axial detection encoded ring 22. Again, this axial displacement of the axial pattern provided by third axial detection encoded ring 22 can be detected by the measurement unit 50 as described above since no A values are counted before the B value from the third axial detection encoded ring 22. The coding patterns of the first and second angular encoded rings 23, 23' overlap the second and third sensors S2 and S3.

As shown in FIG. 17b, two alternating signals S2, S3 are generated by said sensors S2, S3 during a complete revolution of the encoded member 20. Since the coding patterns of first and second angular encoded rings 23, 23' are circumferentially offset the measurement unit 50 is operable to determine the direction of rotation of the encoded member 20 relative to the row of sensors S1, S2, S3. In this configuration, these signals S2, S3 are identical to those originating from a standard incremental encoder given that the signal S2 is phase shifted by 90° with respect to the signal S3. The first sensor S1 always detects the value B as shown in FIG. 17b.

It is noted that for all the embodiments, the sensors and corresponding encoded rings can interact in an electrical manner, magnetic manner, capacitive manner or optical manner. When implemented electrically, the L sensors may comprise conducting brushes making mechanical contact with the axial and angular detection encoded rings of the encoded member. Here, the encoded rings comprise conducting sections for defining value A and insulating sections for defining value B. Depending on whether an insulating or conducting section of an encoded ring is in contact with a particular sensor, said sensor is operable to generate a corresponding signal representing the particular encoded section of the respective encoded ring. For the case with electrical contact, an additional axial ring can be provided adjacent to the first axial detection encoded ring to make electrical contact by means of a brush to define value A of the conducting sections to have a certain electrical voltage.

When implemented magnetically, the encoded rings may be permanently magnetized according to a predefined pattern. A similar approach is conceivable when implemented capacitively. For an optical implementation, the sensors may comprise a light generating element and a light sensitive element while distinct sections on the particular encoded rings feature a different reflectivity.

From the description that has just been given, several variants of the combined angular and axial position sensor arrangement can be devised by those skilled in the art without departing from the scope of the invention defined by the claims. The particular code used for the angular detection encoded rings can be repeated several times on the circumference of the encoded member to increase the measurement resolution.

What is claimed is:

1. An angular and axial position sensor arrangement, including:
   L axially adjacent sensors, where L is a whole number greater than or equal to 2, and
   an encoded member that is angularly and axially displaceable relative to the sensors,
   wherein the encoded member comprises N axial detection encoded rings, which are axially adjacent, and where N is a whole number greater than or equal to 2, for which N−1 adjacent axial detection encoded rings are with value A along their entire circumference and an Nth encoded ring is with value B, different from value A, along its entire circumference, said values A and B being distinguishable by one or several of the L sensors to determine an axial position of the encoded member, in a first axial position with the first sensor overlapping the first axial detection encoded ring, and in an Nth axial position with the first sensor overlapping the Nth axial detection encoded ring,
   wherein the encoded member comprises M angular detection encoded rings, the first of which is axially adjacent to the Nth axial detection encoded ring of the N axial detection encoded rings, where M is a whole number greater than or equal to 1, and wherein the M encoded rings comprise a coding pattern composed of A and B values along their circumference to determine angular position by the sensors.

2. The sensor arrangement according to claim 1, wherein the encoded member is axially displaceable in discrete steps relative to the L sensors.

3. The sensor arrangement according to claim 2, wherein an axial displacement step size of the encoded member corresponds to the axial width of any axial detection encoded ring and any angular detection encoded ring.

4. The sensor arrangement according to claim 1, wherein the distance between any two sensors corresponds to the axial width of one of the axial detection encoded rings or angular detection encoded rings.

5. The sensor arrangement according to claim 1, wherein the sensor arrangement includes a first sensor axially adjacent to a second sensor, and the encoded member with a first axial detection encoded ring adjacent to a second axial detection ring, and an angular detection encoded ring adjacent to the second axial detection ring, and wherein the first axial detection encoded ring has value A along its entire circumference, whereas the second axial detection encoded ring has value B, different from value A, along its entire circumference.

6. The sensor arrangement according to claim 5, wherein the encoded member is axially displaceable from a default position to at least a retracted position.

7. The sensor arrangement according to claim 6, wherein in the default position the first sensor radially overlaps the first axial detection encoded ring and the second sensor radially overlaps the second axial detection encoded ring, and wherein in the retracted position, the first sensor radially overlaps the second axial detection encoded ring and the second sensor radially overlaps the angular detection encoded ring.

8. The sensor arrangement according to claim 1, wherein the sensor arrangement includes at least first and second sensors which are axially adjacent, and the encoded member with first, second, and third axial detection encoded rings which are axially adjacent, and one or more angular detection encoded rings which are axially adjacent, said first angular detection encoded ring being adjacent to the third axial detection ring, and wherein first and second axial detection encoded rings have value A along their entire circumference, whereas the third axial detection encoded ring has value B, different from value A, along its entire circumference.

9. The sensor arrangement according to claim 1, wherein the number M of angular detection encoded rings is less than or equal to L−1, where L is the number of sensors.

10. The sensor arrangement according to claim 8, wherein the coding patterns from the angular detection encoded rings form a binary code or a Gray code.

11. The sensor arrangement according to claim 10, wherein the code is repeated 2 times or more around the encoded member.

12. The sensor arrangement according to claim 1, wherein the sensor arrangement includes at least first, second and third sensors which are axially adjacent, and the encoded member with first, second, third and fourth axial detection encoded rings which are axially adjacent, and at least two angular detection encoded rings which are axially adjacent, said first angular detection encoded ring being adjacent to the fourth axial detection ring, and wherein first, second and third axial detection encoded rings have value A along their entire circumference, whereas the fourth axial detection encoded ring has value B, different from value A, along its entire circumference.

13. The sensor arrangement according to claim 12, wherein the coding patterns from the angular detection encoded rings form a binary code or a Gray code.

14. The sensor arrangement according to claim 13, wherein the code is repeated 2 times or more around the encoded member.

15. The sensor arrangement according to claim 1, wherein the sensor arrangement includes at least L=N−1 sensors which are axially adjacent, and the encoded member with N axial detection encoded rings which are axially adjacent, and at least M=N−2 angular detection encoded rings which are axially adjacent, said first angular detection encoded ring being adjacent to the Nth axial detection ring, and wherein the first N−1 axial detection encoded rings have value A along their entire circumference, whereas the Nth axial detection encoded ring has value B, different from value A, along its entire circumference.

16. The sensor arrangement according to claim 15, wherein the coding patterns from the angular detection encoded rings form a binary code or a Gray code.

17. The sensor arrangement according to claim 16, wherein the code is repeated 2 times or more around the encoded member.

18. The sensor arrangement according to claim 12, wherein the encoded member is axially displaceable step by step from a depressed position to a default position, to a first retracted position and to a second retracted position.

19. The sensor arrangement according to claim 18, wherein in the depressed position, the first, second and third sensors radially overlap the first, second and third axial detection encoded rings and a fourth sensor radially overlaps the fourth axial detection encoded ring, wherein in the default position, the first and second sensors radially overlap the second and third axial detection encoded rings, the third sensor radially overlaps the fourth axial detection encoded ring, and the fourth sensor radially overlaps the first angular detection encoded ring, wherein in the first retracted position, the first sensor radially overlaps the third axial detection encoded ring, the second sensor radially overlaps the fourth axial detection encoded ring, and third and fourth sensors radially overlap the first and second angular detection encoded rings, and wherein in the second retracted position, the first sensor radially overlaps the fourth axial detection encoded ring, and the second, third and fourth sensors radially overlap the first, second and third angular detection encoded rings.

20. The sensor arrangement according to claim 1, further comprising a measurement unit coupled to the L sensors to determine the axial position and angular position of the encoded member.

21. The sensor arrangement according to claim 1, wherein the L sensors interact electrically, magnetically, capacitively or optically with the corresponding encoded rings.

22. An electronic instrument comprising an adjustment unit having at least one sensor arrangement according to claim 1, wherein the encoded member is arranged on an angularly and axially displaceable element.

23. The electronic instrument according to claim 22, for which said electronic instrument is an electronic watch, wherein the encoded member is one part of a rod with a crown on one end.

24. A method of determining angular position and axial position of an encoded member by means of a sensor arrangement that includes L axially adjacent sensors, where L is a whole number greater than or equal to 2, and an encoded member that is angularly and axially displaceable relative to the sensors, wherein the encoded member includes N axial detection encoded rings, which are axially adjacent, and where N is a whole number greater than or equal to 2, for which N−1 adjacent axial detection encoded rings are with value A along their entire circumference and an Nth encoded ring is with value B, different from value A, along its entire circumference, said values A and B being distinguishable by one or several of the L sensors to determine an axial position of the encoded member, in a first axial position with the first sensor overlapping the first axial detection encoded ring, and in an Nth axial position with the first sensor overlapping the Nth axial detection encoded ring, and wherein the encoded member comprises M angular detection encoded rings, the first of which is axially adjacent to the Nth axial detection encoded ring of the N axial detection encoded rings, where M is a whole number greater than or equal to 1, and wherein the M encoded rings comprise a coding pattern composed of A and B values along their circumference to determine angular position by the sensors, the method, comprising:

receiving L signals from the L sensors;

analyzing the L signals to at least determine the axial position of the encoded member, in which a measurement unit coupled to the L sensors determines the axial position by counting the number of A values that are measured before the first B value from the N axial detection encoded rings detected by the sensors; and changing a mode of an electronic instrument based on the determined axial position.

25. A non-transitory computer-readable medium storing computer readable instructions thereon that when executed by a computer cause the computer to perform a method comprising:

processing L signals from L sensors; and analyzing the L signals to at least determine an axial position of an encoded member, in which a measurement unit coupled to the L sensors determines the axial position by counting a number of A values before a first B value measured from an N axial detection encoded rings detected by the sensors.

* * * * *